United States Patent [19]
Jakimas

[11] Patent Number: 4,739,579
[45] Date of Patent: Apr. 26, 1988

[54] SEA ANIMAL TRAP ASSEMBLY

[75] Inventor: John A. Jakimas, 671 Forest St., Kearny, N.J. 07032

[73] Assignees: John A. Jakimas; Richard W. Jakimas, both of Kearny, N.J.

[21] Appl. No.: 848,724

[22] Filed: Apr. 4, 1986

[51] Int. Cl.$^4$ ............................................. A01K 71/00
[52] U.S. Cl. ...................................... 43/102; 43/103; 43/105
[58] Field of Search ................. 43/100, 102, 103, 104, 43/105

[56] References Cited
U.S. PATENT DOCUMENTS

| | | | |
|---|---|---|---|
| 1,193,816 | 8/1916 | Ottmann | 43/105 |
| 2,218,843 | 10/1940 | Fuller | 43/105 |
| 2,821,047 | 1/1958 | Ruiz | 43/102 |
| 2,901,859 | 9/1959 | Hansen | 43/105 |
| 3,427,742 | 2/1969 | Brown | 43/100 |
| 4,050,182 | 9/1977 | Basile | 43/105 |
| 4,416,082 | 11/1983 | Strobel | 43/102 |
| 4,554,760 | 11/1985 | Ponzo | 43/100 |

Primary Examiner—Kurt Rowan
Attorney, Agent, or Firm—Louis E. Marn

[57] ABSTRACT

There is disclosed a novel trap assembly including a spring-loaded body member positioned on and mounted to a base member whereby the body member is capable of raising up into an instant upright operational configuration. The novel trap assembly provided with side wall members hingeably mounted to the base member for encasing the body member during retrieval of the novel trap assembly.

13 Claims, 5 Drawing Sheets

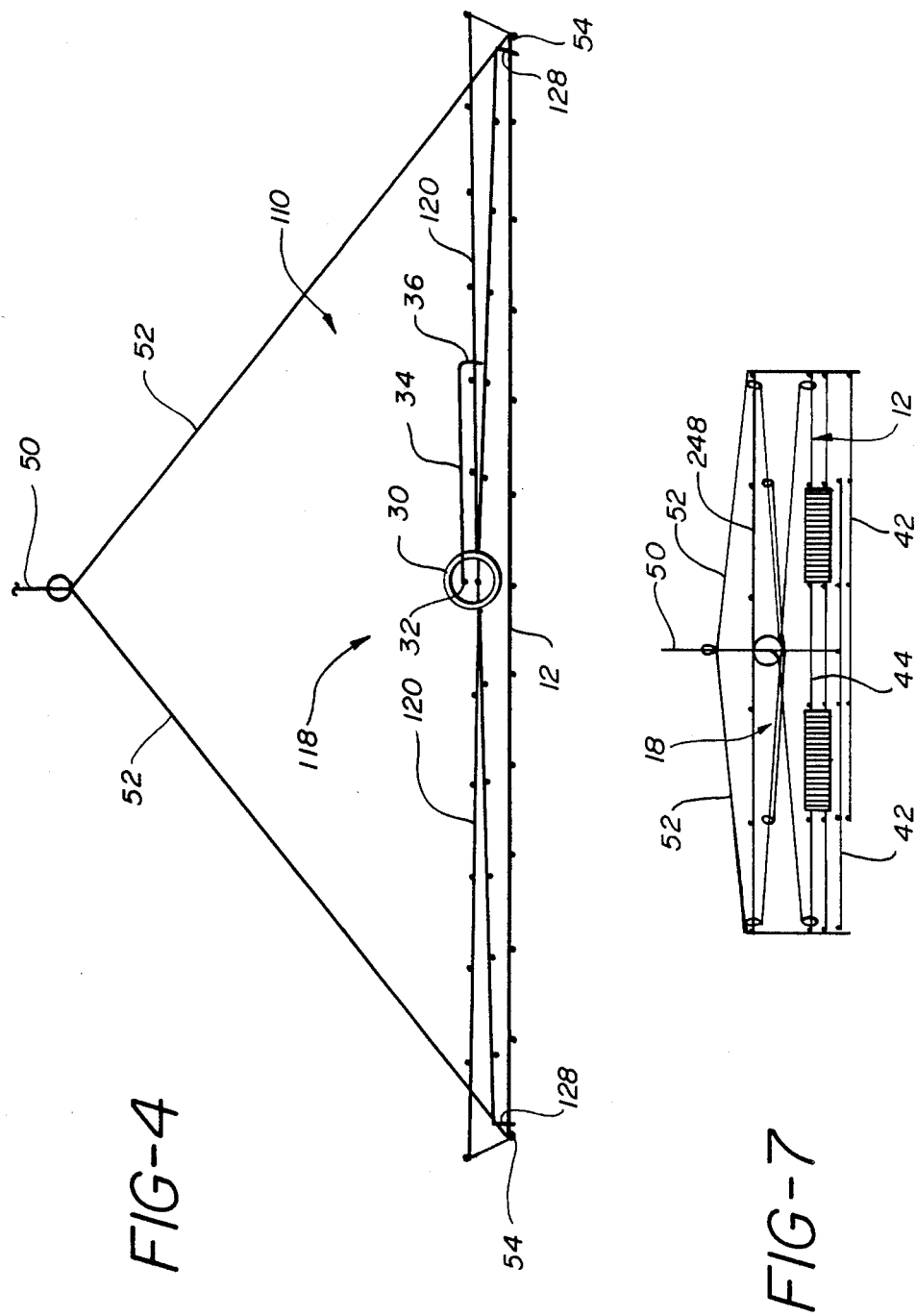

4,739,579

SEA ANIMAL TRAP ASSEMBLY

BACKGROUND OF THE INVENTION (1) Field of the Invention

This inventioin relates to animal traps, and more particularly to a novel trap for snaring sea animals, such as crabs and the like.

(2) Description of the Prior Art

Sea animals, such as crabs, have been routinely ensnared by the use of a net comprised of a ring member having a conically-shaped netting material secured thereto with the ring member being attached to an elongated pole. Generally, the ring member is of a diameter of at least 12 to 16 inches, preferably larger to facilitate capture once the crab is snared and has attached itself to a separately controlled baiting device. The use of such a crab net permits facile capture; however, removal of the thus captured crab is hampered as a result of crab movement and entwining within the netting material. Additionally, the large diameter ring member as well as the elongated pole members do not permit facile storage, let alone convenient access for spur of the moment crabbing.

Other crabbing assemblies of a rigid nature have been developed, e.g. box and pyramid type crabbing assemblies. The box type crabbing assembly is formed with four outwardly collapsible doors. In use, there is no assurance that any or all of the doors open when the box trap is cast into the water, since no door control elements are provided for the box trap assembly. Additionally, the box trap suffers from time consuming and annoying assembly requirements.

In U.S. Pat. No. 4,479,325 to the same Applicant, there is disclosed a collapsible trap assembly comprised of outer wall members formed of a semi-rigid netting substrate hingeably mounted to each other about one end portion thereof with another end portion of each wall member opposite the hinged end portion thereof provided with flexible lines to effect hingeable movement of the outer wall members into a closed position, preferably with an intermediate wall member for hingeably mounting the outer wall members as well as to provide post elements for the flexible lines. While such trap assembly permits facile assembly, manipulative steps are required to place the trap assembly from a stowed configuration into operational mode, and vice versa.

OBJECTS OF THE INVENTION

An object of the present invention is to provide a novel trap assembly.

Another object of the present invention is to provide a novel trap assembly particularly adapted for crabbing.

Yet another object of the present invention is to provide a novel trap assembly readily placed into operational mode.

Still another object of the present invention is to provide a novel collapsible trap assembly readily collapsible into a stowed configuration.

A further object of the present invention is to provide a novel trap assembly permitting of more facile control of the trap assembly.

Yet a further object of the present invention is to provide a novel trap assembly permitting of positive assembly when cast into a body of water.

A still further object of the present invention is to provide a novel trap assembly obviating detailed assemblage requirements prior to usage.

SUMMARY OF THE INVENTION

These and other objects of the present invention are achieved by a novel trap assembly including a spring-loaded body member positioned on and mounted to a base member whereby the body member is capable of raising up into an instant upright operational configuration. The novel trap assembly may be provided with side wall members hingeably mounted to the base member for encasing the body member during retrieval of the novel trap assembly.

BRIEF DESCRIPTION OF THE DRAWINGS

A better understanding of the present invention may be obtained by reference to the following detailed description thereof, especially when taken with the accompanying drawings, wherein like numerals designate like parts throughout and wherein:

FIG. 4 is a somewhat schematic side of another embodiment of the present invention in a stowed configuration;

FIG. 7 is a somewhat schematic side view of the trap assembly of FIG. 6 in a stowed configuration.

DETAILED DESCRIPTION OF THE INVENTION

Figure 1:
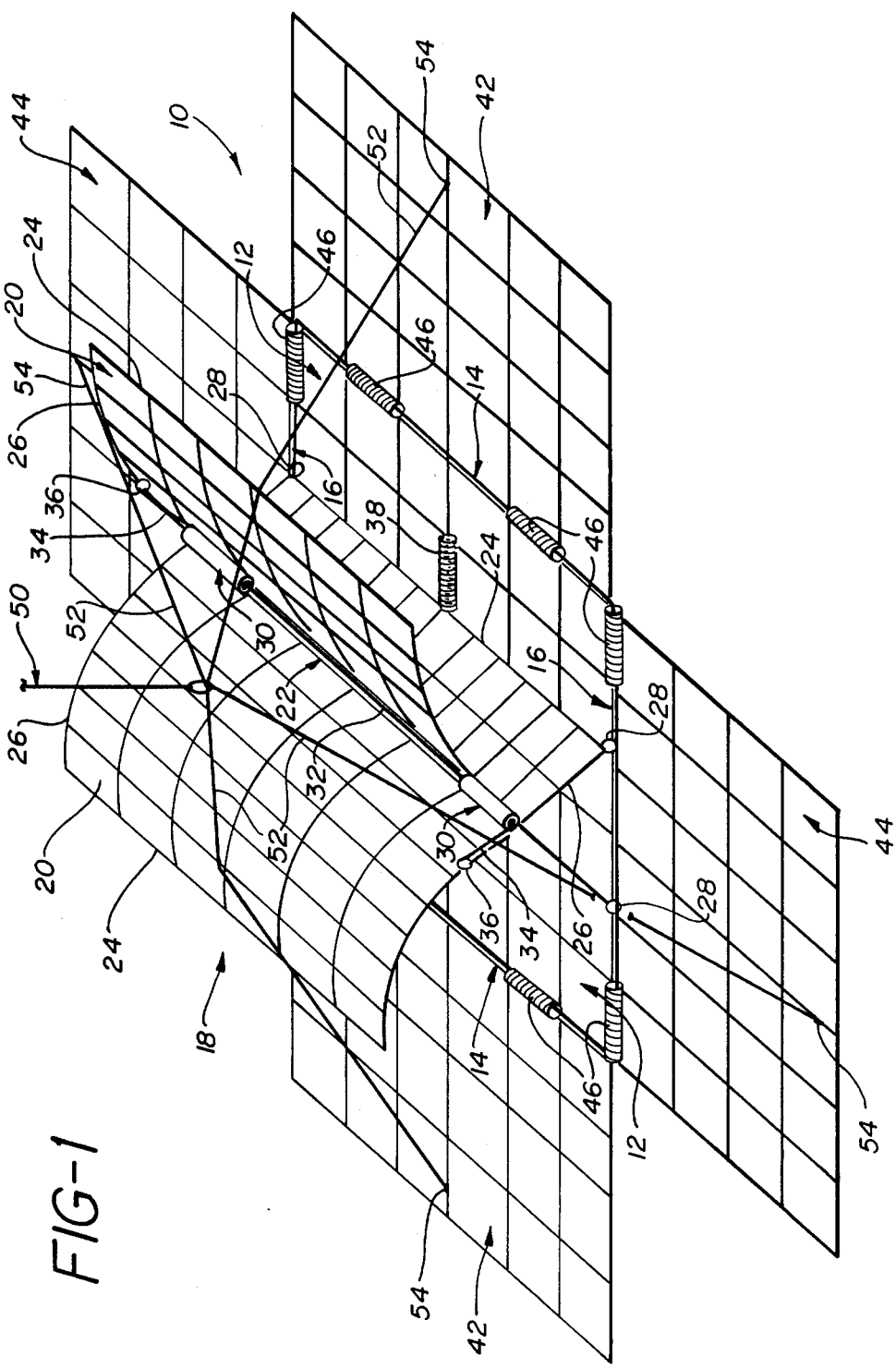
FIG. 1 is an isometric view of one embodiment of the trap assembly of the present invention.

Referring now to the drawings, and particularly to FIG. 1, there is illustrated one embodiment a novel trap assembly of the present invention, generally indicated as 10, comprised of a base member 12 having parallel sides 14 and 16 and a body member, generally indicated as 18, mounted to the base member 12. The base member 12 is square-shaped and is formed of a semi-rigid netting material, such as galvenized wire mesh, or like rigid material, exhibiting resistance to the corrosive effect of saline water, it being understood that the base member 12 may be rectangularly-shaped or some other geometric configuration. The galvenized wire mesh is generally of a square or rectangular mesh size of from about ½ to 2 inches.

The body member 18 is comprised of two partition members 20 hingeably mounted to one another and including a wire spring member 22. The partition members 20 are similarly formed of a semi-rigid netting material with side sections 24 and parallel end sides 26 with one parallel side 24 of each partition member 20 mounted to wire portions of the parallel sides 16 of the base member 12 by loop members 28 formed on corners of each partition member 20 proximate the base member 12 encircling such wire portions of the base member 12 along the parallel sides 16 thereof thereby permitting each partition member 20 to slidably move with respect to the base member 12. The partition members 20 are hingeably mounted transversely to one another by cylindrically-shaped sleeve members 30 positioned about wire sections of each of the partition members 20 at a point intermediate slidable parallel sides 24 and free-end parallel sides 24 thereof thereby forming a hinge axis generally parallel to the plane of the base member 12 as well as parallel to the parallel sides 24 thereof.

Figure 2:
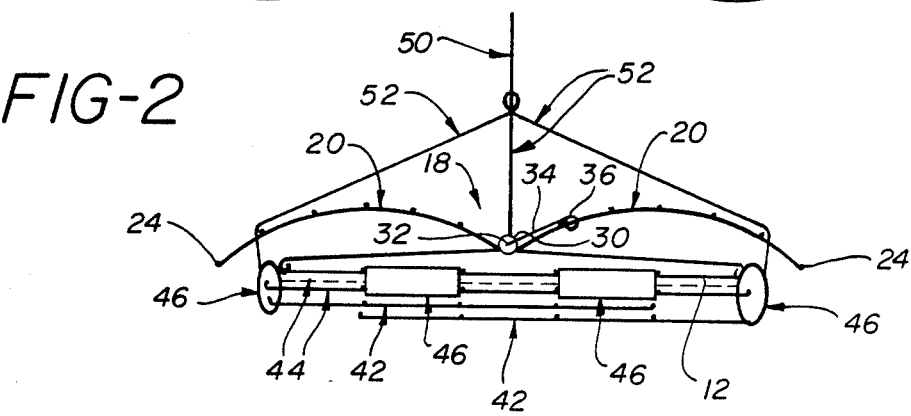
FIG. 2 is a somewhat schematic side view of the trap assembly of FIG. 1 in a closed or stowed configuration.

The wire spring member 22 is comprised of an elongated wire body 32 formed with arm portions 34 perpendicularly-disposed to the wire body 32 and extending outwardly at opposed angles from one another. The elongated wire body 32 is positioned about the hinged axis formed by the partition members 20 and is disposed within the sleeve members 30 with respective arm portions 34 thereof mounted to wire sections of the parallel end sides 26 of each partition member 20, such as by loop members 36 formed on terminal end portions of each of the arm portions 34 of the elongated wire body 32. In the configuration illustrated in FIG. 1, the partition members 20 are in an extended position with upper sections thereof above the hinged section formed of a concave surface with respect to the base member 12 and are generally of a width greater than the width of the base member 12 as illustrated in FIG. 2. As illustrated in FIG. 2, the partition members 20 are in a collapsed or stowed configuration against the spring compression forces of the wire spring member 22 generated when the arm portions 34 are rotated from the configuration illustrated in FIG. 1 to that of FIG. 2.

To assist in extending the partition members 20 of the body assembly 18 from the configuration illustrated in FIG. 2 to the configuration illustrated in FIG. 1, coil spring members 38 under compression may be provided on wire sections of the base member 12 intermediate the parallel sides 14 thereof and in contact with loop members 40 formed on an end of a wire section along parallel sides 24 of each of the partition members 20 proximate the base member 12.

To the parallel sides 14 and 16 of the base member 12, the trap assembly 10 is provided with hingeably mounted outer side walls 42 and outer end walls 44, such as by cylindrically-shaped sleeve members 46 capturing wire sections of parallel sides 14 and 16, respectively, of the base member 12 with adjoining wire sections of the outer side walls 42 and outer end walls 44, respectively. The outer side and outer end walls 42 and 44 are similarly formed of a semi-rigid netting material, and are generally shaped to the configuration of the base member 12. The outer side walls 42 and the outer end walls 44 may be rotated almost 360°, and by 180° to a closed or stowed configuration of the body member 18 of the trap assembly 10 (FIG. 1 to FIG. 2), whereas in a retrieving configuration of the trap assembly 10, as illustrated in FIG. 3 with the body member 18 in an extended position, the outer side walls 42 and outer end walls 44 may be rotated to an upwardly extended position (through 90° from the position illustrated in FIG. 1) perpendicularly-disposed to the base member 12 limited in upward rotation by contact of such outer side walls 42 and outer end walls 44 with parallel sides 24 and parallel end sides 26, respectively, of the partition members 20 of the body member 18.

The trap assembly 10 of the present invention includes a flexible retrieving line member 50 to which are attached individual line sections 52 having terminal portions 54 affixed to wire elements of the outer side walls 42 and outer end walls 44.

Figure 3:
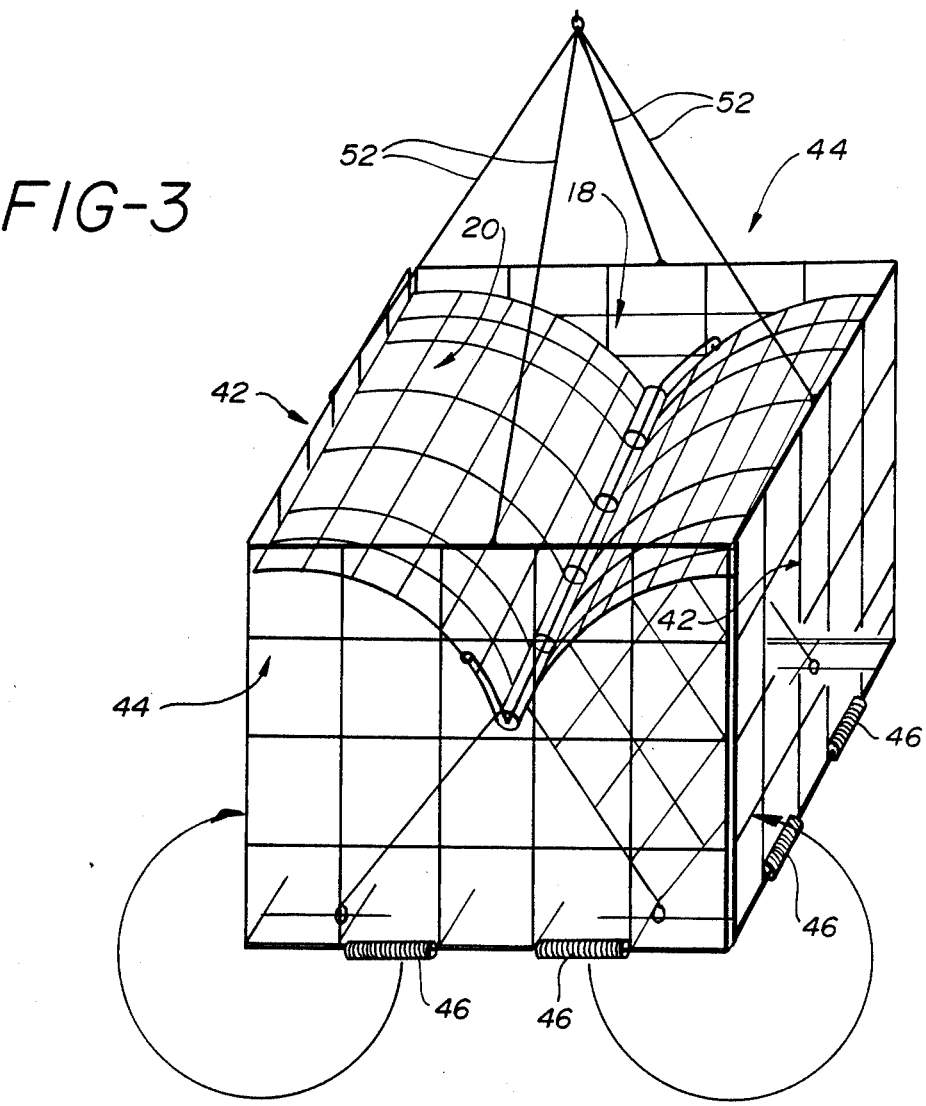
FIG. 3 is an isometric view of the trap assembly of FIG. 1 in a retrieving configuration.

The trap assembly 10 may be maintained in a closed or stowed configuration, as illustrated in FIG. 3, by providing preselect lengths of line sections 52 coursing through the partition members 20 and mounted to outer side walls 42. With such preselect lengths of line sections 52, and upon folding the outer side walls 42 about the sleeve members 46 to a point where the outer side walls 42 are essentially co-planar with the underside of the base member 12, the preselect lengths of line sections 52 cause by tensioning of such preselect lengths of line sections 52 the partition members 20 to be drawn down against the upper side of the base member 12 whereupon subsequent folding of the outer end walls 44 about the sleeve members 46 into essentially co-planar relationship with the base member 12 locks the trap assembly 10 into the closed or stowed configuration. The line sections 52 attached to the outer side walls 42 are coursed through open areas between wire sections in the upper portion of each partition member 20.

Figure 5:
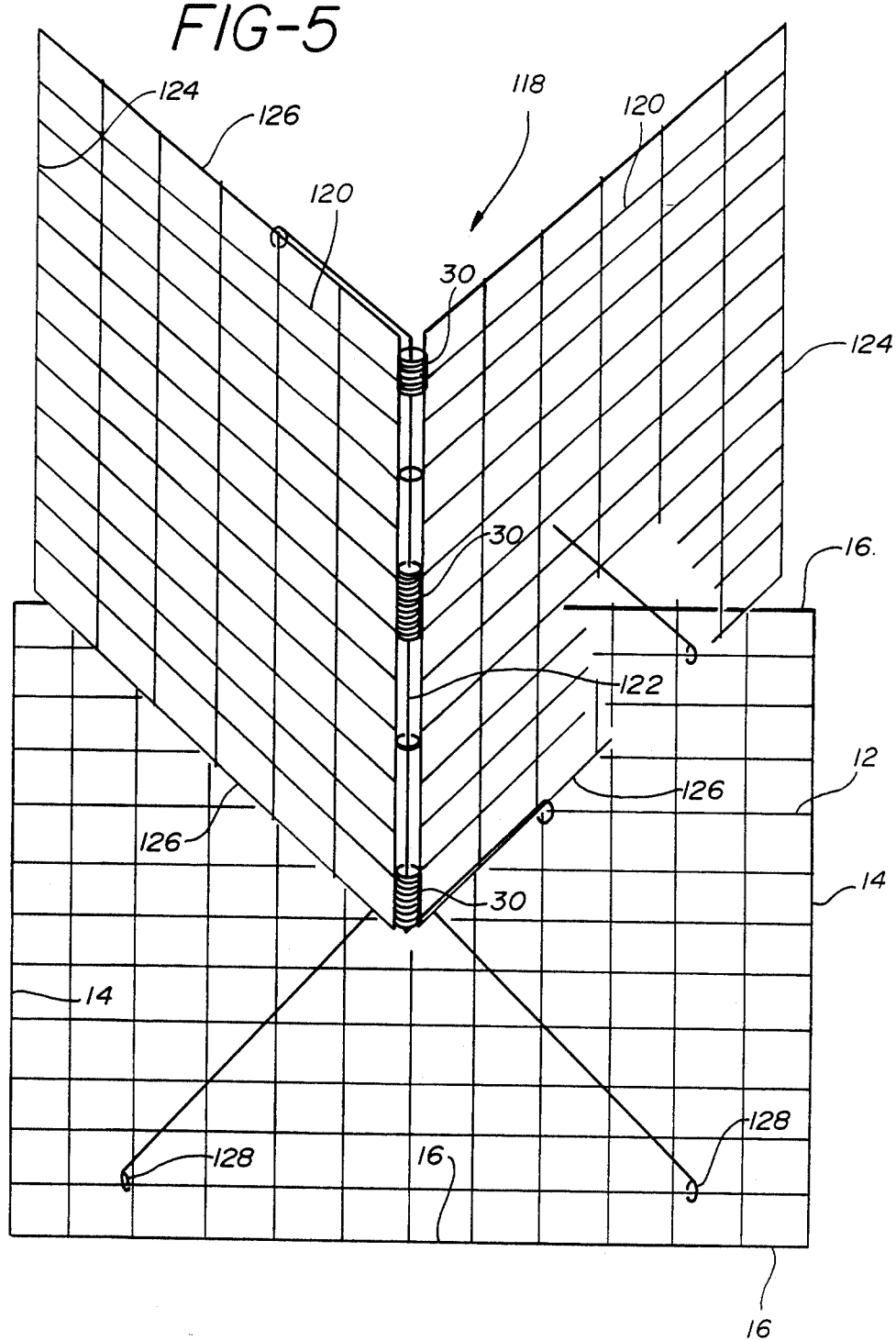
FIG. 5 is an isometric view of the embodiment of FIG. 4 of the present invention in an opened configuration.

Referring now to FIGS. 4 and 5, there is illustrated another embodiment of a novel trap assembly of the present invention, generally indicated as 110, comprised of a base member 12 having parallel sides 14 and 16 and a body member, generally indicated as 118, mounted to the base member 12 as hereinabove discussed with reference to the embodiment of FIGS. 1 to 3. FIG. 4 illustrates the trap assembly 110 in a stowed configuration. The body member 118 is comprised of two partition members 120 hingeably mounted to one another and including a wire spring member 122. The partition members 120 are similarly formed of a semi-rigid netting material with parallel sides 124 and parallel end sides 126 with one parallel side 124 of each partition member 120 slidably-disposed with respect to the base member 12. The parallel sides 124 of the partition members 120 mounted to wire portions of the parallel sides 16 of the base member 12 by loop members 128 formed proximate the intersection of parallel sides 124 with parallel end sides 126 of each partition member 120 proximate the base member 12 encircling such wire portions of the base member 12 along the parallel sides 16 thereof.

The partition members 120 are hingeably mounted transversely to one another by cylindrically-shaped sleeve members 30 positioned about wire sections of each of the partition members 120 at a point intermediate slidable parallel sides 124 and free-end parallel sides 124 thereby forming a hinge axis generally parallel to the plane of the base member 12 as well as parallel to the parallel sides 14 thereof.

The wire spring member 22 of the trap assembly of FIGS. 4 and 5 is similarly comprised of an elongated wire body 32 formed with arm portions 34 perpendicularly-disposed to the elongated wire body 32 and extending outwardly at opposed angles from one another. The elongated wire body 32 is positioned about the hinged axis formed by the partition members 120 and is disposed within the sleeve members 30 with respective arm portions 34 thereof mounted to wire sections of the parallel end sides 126 of each partition member 120, such as by loop members 36 formed on terminal end portions of each of the arm portions 34 of the elongated wire body 32. In the configuration illustrated in FIG. 4, the partition members 120 are in a collapsed or stowed configuration against the spring compression forces of the wire spring member 22 generated when the arm portions 34 are rotated as more fully hereinafter discussed.

The trap assembly 10 of the present invention illustrated in FIGS. 4 and 5 includes a flexible retrieving line member 150 to which are attached individual line sections 152 having terminal portions 154 affixed to wire elements of parallel sides 124 of each partition member 120.

Figure 6:
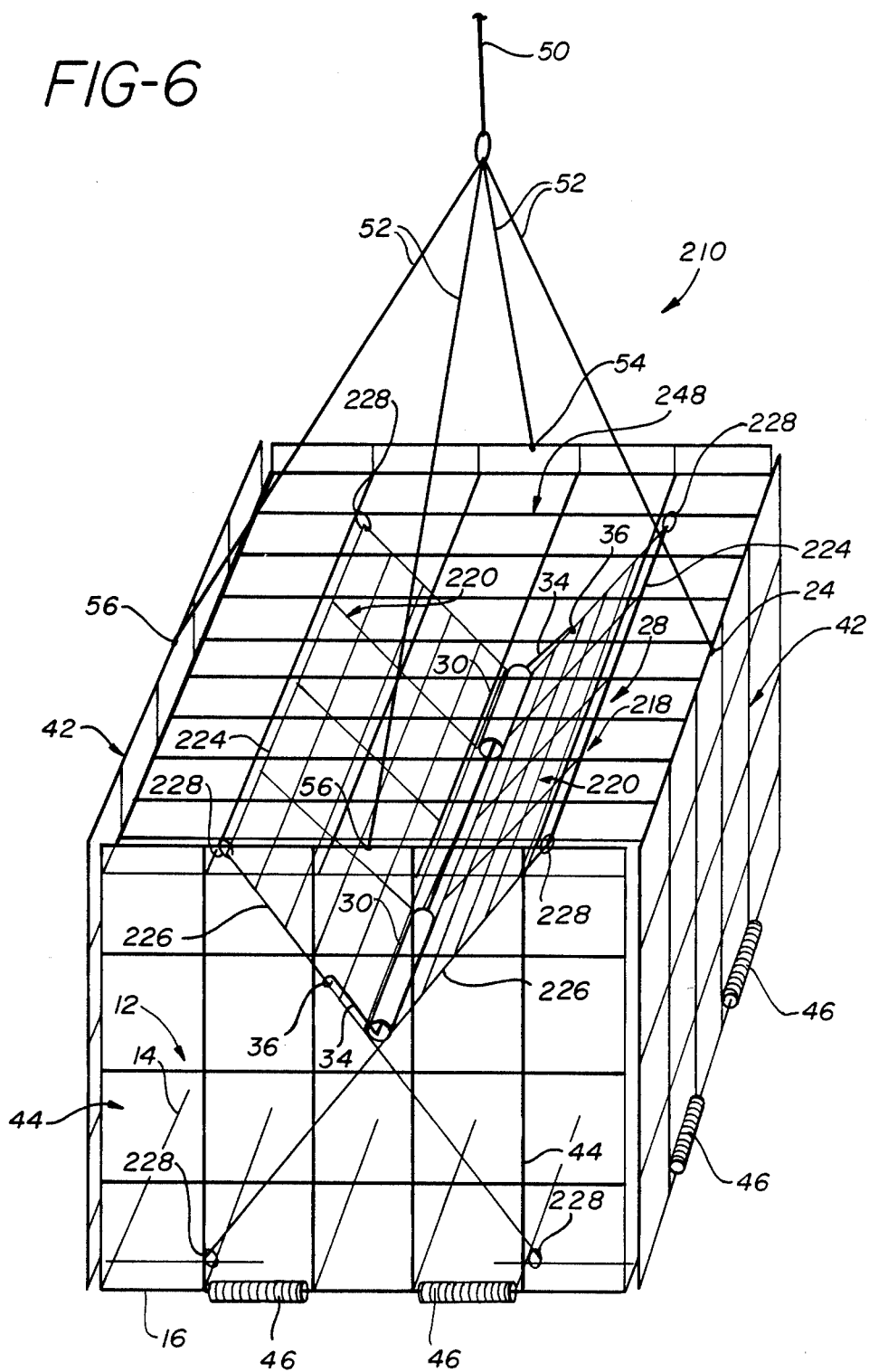
FIG. 6 is an isometric view of another embodiment of the present invention in a retrieving configuration.

Referring now to FIGS. 6 and 7, there is illustrated still another embodiment of a novel trap assembly of the present invention, generally indicated as 210, comprised of a base member 12 having parallel sides 14 and 16 and a body member, generally indicated as 218, mounted to the base member 12 as hereinabove discussed with reference to the embodiment of FIGS. 1 to 3. FIG. 6 illustrates the trap assembly 210 in a retrieving configuration. The body member 218 is comprised of two partition members 220 hingeably mounted to one another and including a wire spring member 22. The partition members 220 are similarly formed of a semi-rigid netting material with parallel sides 224 and parallel end sides 226 with one parallel side 224 of each partition member 220 slidably-disposed with respect to the base member 12. The parallel sides 224 of the partition members 220 are mounted to wire portions of the parallel sides 16 of the base member 12 by loop members 228 formed proximate corners of each partition member 220 proximate the base wall member 12 incircling such wire portions of the base member 12 proximate the parallel sides 16 thereof.

The partition members 220 are hingeably mounted transversely to one another by cylindrically-shaped sleeve members 30 positioned about wire sections of each of the partition members 220 at a point intermediate parallel sides 224 thereby forming a hinge axis generally parallel to the plane of the base member 12 as well as parallel the the parallel sides 14 thereof.

The wire spring member 22 of the embodiment of FIGS. 6 and 7 is similarly comprised of an elongated wire body 32 formed with arm portions 34 perpendicularly-disposed to the elongated wire body 32 and extending outwardly at opposed angles from one another. The elongated wire body 32 is positioned about the hinged axis formed by the partition members 220 and is disposed within the sleeve members 30 with respective arm portions 34 thereof mounted to wire sections of the parallel end sides 226 of each partition member 220, such as by loop members 36 formed on terminal end portions of each of the arm portions of the elongated wire body. In the configuration illustrated in FIG. 6, the partition members 220 are in an extended position. In FIG. 7, the partitions members 220 are in a collapsed or stowed configuration, as hereinabove discussed with reference to the embodiment of FIG. 2.

The embodiment of FIGS. 6 and 7 includes a top wall member 248 mounted to each of the partition members 220, such as by loop members 228 formed proximate the corners of each of the partition members 220 encircling such wire portions of the top wall member 248. Thus, the top wall member 248 is slidably movable with respect to the partition members 220.

To the parallel sides 14 and 16 of the base member 12, the trap assembly 210 is provided with hingeably mounted outer side walls 42 and outer end walls 44, such as by cylindrically-shaped sleeve members 46 capturing wire sections of parallel sides 14 and 16, respectively, of the base member 12 with adjoining wire sections of the outer side walls 42 and outer end walls 44, respectively. The outer side and outer end walls 42 and 44 are similarly formed of a semi-rigid netting material, and are generally shaped to the configuration of the base member 12. The outer side walls 42 and the outer end walls 44 may be rotated as discussed with reference to the embodiment of FIGS. 1 to 3.

The trap assembly 210 of the present invention illustrated in FIGS. 6 and 7 includes a flexible retrieving line member 50 to which are attached individual line sections 52 having terminal portions 54 affixed to wire elements of the outer side walls 42 and outer end walls 44.

In operation, the trap assembly 10, 110 and 210 as removed from a storage compartment is basically a planar unit, as illustrated in FIGS. 2, 5 and 7, respectively. Generally, the trap assembly is partially unfolded to permit access to preferable bait areas, such as an entrapment zone or zones formed by the undersurface of the partition members 20 in an extended configuration with the upper surface of the base member 12, referring particularly to trap assembly 10. After positioning of appropriate bait material, the outer side and end walls 42 and 44 may be refolded beneath the lower surface of the base wall member 12 for more efficacious casting of the trap assembly 10 effected by launching with one hand with sufficient muscular strength to a preselect location while retaining the flexible retrieving line member 50 in the other hand. Upon casting of the trap assembly 10 to the preselect site, the trap assembly generally unfolds to assume the configuration illustrated in FIG. 3 during descent thereof within the fluid environment with the base member 12 generally in contact therewith, the outer side and outer end walls 42 and 44 generally rotate outwardly about the cylindrically-shaped sleeve members 46 whereby the trap assembly 10 assumes the configuration illustrated in FIG. 1 with the body member 18 in the upwardly extended position.

Once one or more crabs have entered into the entrapment zone(s) formed by the extended partition members 20 with the base member 12, the flexible retrieving line member is quickly retrieved whereupon the outer side and end wall sections 42 and 44 hingeably rotate about the sleeve members 46 thereby to assume the configuration of FIG. 3 and imprisoning the crabs therein with retrieving of the trap assembly 10 being continued until the trap assembly 10 is positioned on a support surface for removal of any catch therefrom.

In the embodiment as particularly illustrated in FIG. 1, the partition members 20 need not be formed with wire netting sections below the hinged axis thereof; however, the provision for wire netting sections provides a convenient area for positioning bait in a manner to conserve same by limiting access to the bait.

While the present invention has been described with extendable partition members formed in part, or in total of a netted material, it will be understood that the partition members may be formed of a frame member, i.e. only sides, etc., and not of a netted material, in which event a top wall member is required, such as the top wall member 248 illustrated in FIG. 6. Additionally, while the spring member is formed of a wire extending co-axially along the hinge axis of the partition members, it will be understood that spring elements may be used to cooperate between sides of the partition members.

What is claimed is:
1. A trap assembly, which comprises:
a base member formed of a netting material;
a body member mounted to said base member and comprised of partition members formed in part of a netting material, each of said partition members having a free-end side and an opposite closed-end side, said partition members being hingeably mounted to one another about a point intermediate said sides thereof, said point at which said partition members of said body member are hingeably mounted in crossing fashion being positioned over said base member, said partition members being mounted to said base member at said closed-end sides of said partition members for movement between a closed configuration to an extended configuration, said partition members in said closed configuration being essentially co-planar with said base member, said partition members in said extended configuration being disposed upwardly from said base member to define an entrapment zone between said base member and said partition members; and a spring connected to said partition members for effecting movement of said partition members from said closed configuration to said extended configuration.

2. The trap assembly as defined in claim 1 wherein said partition members are mounted to wire sections of said base member for slidable movement with respect to said wire sections.

3. The trap assembly as defined in claim 1 wherein said spring includes a rod member having arm members extending outwardly at opposing angles connected to said partition member.

4. The trap assembly as defined in claims 1 or 2 and further including outer side walls rotatably mounted to said base member.

5. The trap assembly as defined in claim 4 and further including a top wall member mounted to said body member.

6. The trap assembly as defined in claim 5 wherein said top member is slidably mounted to said partition members of said body member.

7. The trap assembly as defined in claim 1 and further including a top wall member mounted to said body member.

8. The trap assembly as defined in claim 7 wherein said top wall member is slidably mounted to said partition members of said body member.

9. The trap assembly as defined in claims 1 or 2 and further including a retrieving line connected to said trap assembly.

10. The trap assembly as defined in claim 9 wherein said retrieving line is comprised of segments attached to said outer side walls.

11. A trap assembly, which comprises:

a base member formed of a netting material;

a body member mounted to said base member and comprised of partition members formed in part of netting material, each of said partition members having a free-end side and a closed-end side, said partition members being hingeably mounted in crossing fashion to one another, about a point intermediate said sides thereof, said point at which said partition members of said body member are hingeably mounted being positioned over said base member, said partition members being mounted to said base member at said closed-end sides of said partition members for movement between a collapsed configuration to an extended configuration, said partition members in said closed configuration being essentially co-planar with said base member, said partition members in said extended configuration disposed upwardly from said base member to define an entrapment zone between said base member and said partition members;

a top wall member mounted to said free-end sides of said partition members and disposed above said base member; and a spring connected to said partition members for effecting movement of said partition members from said collapsed configuration to said extended configuration.

12. The trap assembly as defined in claim 11 wherein said partition members are mounted to wire sections of said base member for slidable movement with respect to said wire sections.

13. The trap assembly as defined in claim 12 wherein said partition members are mounted to wire sections of said top wall member for slidable movement with respect to said wire sections of said top wall member.

* * * * *